United States Patent
Wang (10) Patent No.: US 9,470,276 B2
(45) Date of Patent: Oct. 18, 2016

(54) BI-DIRECTIONAL ACTUATOR FOR A MOTOR VEHICLE DRIVE TRAIN

(71) Applicant: Schaeffler Technologies GmbH & Co. KG, Herzogenaurach (DE)

(72) Inventor: Yang Wang, Mt. Pleasant, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/331,115

(22) Filed: Jul. 14, 2014

(65) Prior Publication Data

US 2015/0021138 A1  Jan. 22, 2015

Related U.S. Application Data

(60) Provisional application No. 61/846,887, filed on Jul. 16, 2013.

(51) Int. Cl.
| | |
|---|---|
| *F16D 11/04* | (2006.01) |
| *F16D 23/04* | (2006.01) |
| *F16D 23/12* | (2006.01) |
| *F16D 13/38* | (2006.01) |
| *B60K 23/08* | (2006.01) |

(52) U.S. Cl.
CPC ............ *F16D 23/04* (2013.01); *B60K 23/08* (2013.01); *F16D 11/04* (2013.01); *F16D 13/38* (2013.01); *F16D 23/12* (2013.01); *F16D 2023/123* (2013.01)

(58) Field of Classification Search
CPC .............. F16D 2011/004; F16D 2023/123; F16D 23/04; F16D 11/04; F16D 13/38
USPC .......... 192/35, 93 A, 52.1, 53.1, 69.2, 69.91, 192/25, 24
See application file for complete search history.

(56) References Cited

U.S. PATENT DOCUMENTS

| | | | |
|---|---|---|---|
| 45,297 A | 11/1864 | Hamilton | |
| 2,642,970 A * | 6/1953 | Szekely | ........................ 192/24 |
| 3,194,367 A * | 7/1965 | Winter | ....................... 192/18 B |
| 3,875,805 A * | 4/1975 | Toulier | ............................ 74/7 R |
| 3,935,934 A * | 2/1976 | Norberg | ......................... 192/46 |
| 4,271,942 A * | 6/1981 | Ballendux | ............. B60K 17/28 |
| | | | 192/48.91 |
| 4,966,267 A * | 10/1990 | Carlton | ..................... 192/48.91 |
| 6,688,194 B2 | 2/2004 | Dissett et al. | |
| 7,311,632 B2 | 12/2007 | Dissett et al. | |
| 8,051,969 B2 | 11/2011 | Smith et al. | |
| 8,302,752 B2 * | 11/2012 | Gokan et al. | ................. 192/54.5 |
| 2003/0075412 A1 * | 4/2003 | Heiartz et al. | .................. 192/20 |

FOREIGN PATENT DOCUMENTS

DE   WO 2012055386 A1 *  5/2012  ............. F16D 21/04

* cited by examiner

*Primary Examiner* — Terry Chau
(74) *Attorney, Agent, or Firm* — Davidson, Davidson & Kappel, LLC (57) ABSTRACT

A bi-directional actuator for a motor vehicle drive train is provided. The actuator includes a first axially stationary part; a second axially stationary part; an activation part between the first axially stationary part and the second axially stationary part, the activation part being axially movable to alternately contact the first axially stationary part and the second axially stationary part; and an actuation part engaging the first axially stationary part and the second axially stationary part, contact between the activation part and the first axially stationary part causing the first axially stationary part to force the actuation part in a first axial direction, contact between the activation part and the second axially stationary part causing the second axially stationary part to force the actuation part in a second axial direction.

19 Claims, 6 Drawing Sheets

BI-DIRECTIONAL ACTUATOR FOR A MOTOR VEHICLE DRIVE TRAIN

This claims the benefit to U.S. Provisional Patent Application No. 61/846,887, filed on Jul. 16, 2013, which is hereby incorporated by reference herein.

The present disclosure relates to an actuator for a motor vehicle drive train, and more particularly to a bi-directional actuator for a motor vehicle drive train.

BACKGROUND

U.S. Pat. No. 45,297 discloses a tool-elevator for turning lathes including two pieces each having two spiral surfaces. Rotating one of the pieces causes the other piece to move away from the rotated piece.

U.S. Pat. No. 7,311,632 discloses a gearless locking differential that includes clutch housings containing v-shaped slots that cooperate with a cross pin to disconnect an overrunning driven shaft from a differential drive shaft.

SUMMARY OF THE INVENTION

A bi-directional actuator for a motor vehicle drive train is provided. The bi-directional actuator includes a first axially stationary part, a second axially stationary part and an activation part between the first axially stationary part and the second axially stationary part. The activation part is axially movable to alternately contact the first axially stationary part and the second axially stationary part. The actuation part may include a first engagement surface for mechanically engaging a first rotatable component and a second engagement surface for mechanically engaging a second rotatable component. The bi-directional actuator also includes an actuation part engaging the first axially stationary part and the second axially stationary part. Contact between the activation part and the first axially stationary part causes the first axially stationary part to force the actuation part in a first axial direction and contact between the activation part and the second axially stationary part causes the second axially stationary part to force the actuation part in a second axial direction.

Embodiments of the bi-directional actuator may also include one or more of the following advantageous features:

The first axially stationary part may include a first radially extending plate portion and the second axially stationary part may include a second radially extending plate portion. The activation part may alternately contact the first radially extending plate portion and the second radially extending plate portion. The activation part may be a clutch plate. The first axially stationary part may include a first axially extending sleeve portion and the second axially stationary part may include a second axially extending sleeve portion. The actuation part may engage the first axially extending sleeve portion and the second axially extending sleeve portion. The actuation part may include a first engagement surface for mechanically engaging a first rotatable component and a second engagement surface for mechanically engage a second rotatable component. The first axially stationary part may include at least one first cam surface and the second axially stationary part may include at least one second cam surface. The actuation part may include at least one cam follower for engaging the at least one first cam surface and the at least one second cam surface. The at least one first cam surface may be formed by at least one first slot formed in the first axially stationary part and the at least one second cam surface is formed by at least one second slot formed in the second axially stationary part. The at least one cam follower may be at least one radially extending pin for sliding in the at least one first slot and the at least one second slot. The at least one first slot may extend axially and circumferentially in the first axially stationary part such that the at least one first slot extends in the first axial direction and a first rotational direction. The at least one second slot may extend axially and circumferentially in the second axially stationary part such that the at least one second slot extends in the first axial direction and a second rotational direction opposite the first rotational direction.

A torque coupling including the bi-directional actuator is also provided. The torque coupling includes a housing. The first axially stationary part and the second axially stationary part are axially fixed to the housing and the activation part is non-rotatably fixed to housing.

A motor vehicle drive train is also provided. The motor vehicle drive train includes a first rotatable component, a second rotatable component and the torque coupling for selectively connecting the first rotatable component to the second rotatable component.

A method of operating a bi-directional actuator in a motor vehicle is also provided. The method includes slowing a rotation of a first axially stationary part such that a surface of the first axially stationary part forces an actuation part in a first axial direction; and slowing a rotation of a second axially stationary part such that a surface of the second axially stationary part forces the actuation part in a second axial direction opposite the first axial direction.

Embodiments of the method may also include one or more of the following advantageous features:

The slowing the rotation of the first axially stationary part includes contacting the first axially stationary part with a clutch plate and the slowing the rotation of the second axially stationary part includes contacting the second axially stationary part with the clutch plate. The slowing the rotation of the first axially stationary part may cause a cam follower of the actuation part to slide from the outer axial portion of the surface of the first axially stationary part to the inner axial portion of the surface of the first axially stationary part to force the actuation part in the first axial direction. The surface of the second axially stationary part may include an inner axial portion and an outer axial portion and the slowing the rotation of the second axially stationary part may cause the cam follower to slide from the outer axial portion of the surface of the second axially stationary part to the inner axial portion of the surface of the second axially stationary part to force the actuation part in the second axial direction. A first engagement surface of the actuation part may mechanically engage a first rotatable component during the slowing the rotation of the first axially stationary part and the slowing the rotation of the second axially stationary part. The slowing the rotation of the first axially stationary part may cause a second engagement surface of the actuation part to mechanically engage a second rotatable component and the slowing the rotation of the second axially stationary part may cause the second engagement surface of the actuation part to mechanically disengage from the second rotatable component.

BRIEF DESCRIPTION OF THE DRAWINGS

The present invention is described below by reference to the following drawings, in which:

FIG. 1b shows two rotatable components of the motor vehicle drive train shown in FIG. 1a;

FIG. 2b shows a perspective view of the bi-directional actuator shown in FIG. 2a;

DETAILED DESCRIPTION

The disclosure shows bi-directional actuator for sliding an actuation part in opposite directions. The actuation part is connectable to two different rotatable components to selectively transfer torque from one rotatable component to the other rotatable component. The bi-directional actuator may accomplish all-wheel drive (AWD) by moving the actuation part axially between two positions. Embodiments of the present invention retract the linear/axial mechanism without the need to reverse the rotation of the rotatable components. The design of the bi-directional actuator allows the actuation part to be actuated in either direction regardless which direction the rotatable components are rotating.

Figure 1A:
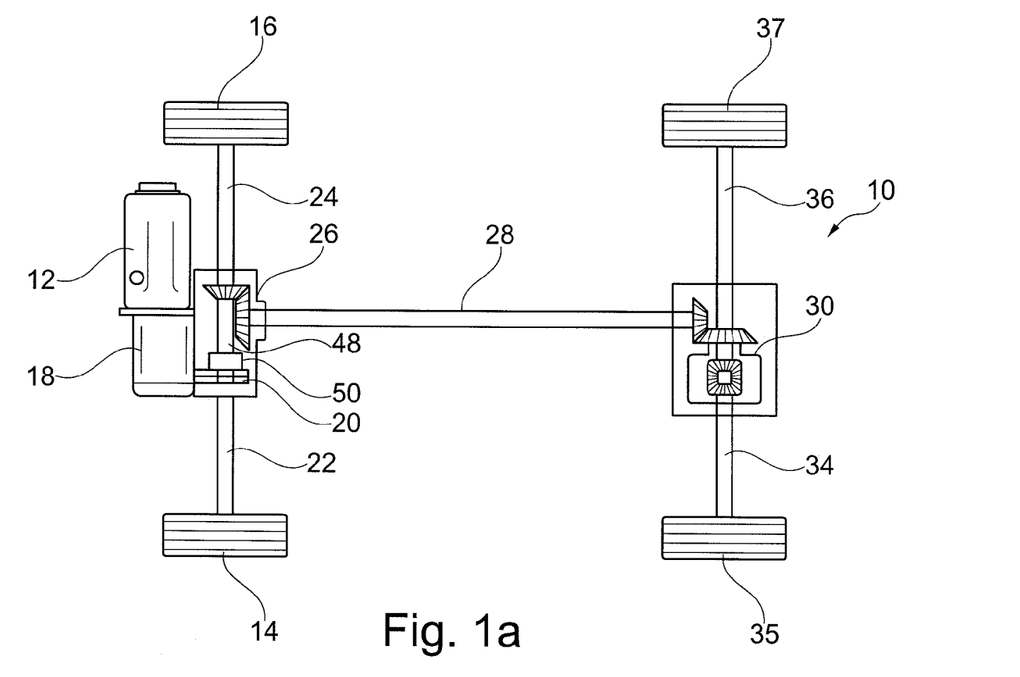
FIG. 1a shows a motor vehicle drive train in accordance with an embodiment of the present invention.

FIG. 1a shows an AWD motor vehicle drive train 10 according to an embodiment of the present invention. Drive train 10 includes an engine 12 driving a pair of front wheels 14, 16 via a transmission 18. A front differential 20 is provided between transmission 18 and respective axles 22, 24 of front wheels 14, 16 to allow for speed differences between front wheels 14, 16. A power takeoff unit (PTU) 26 is connected to front differential 20 for transferring power via a rear wheel drive shaft 28 to a pair of rear wheels 30, 32 via respective axles 34, 36. Rear wheel drive shaft 28 is connected to a rear differential 30 from which rear axles 34, 36 extend. A bi-directional actuator 50 is provided for connecting an input shaft 38 of PTU 26 to front differential 20 so that rear wheels 35, 37 may be driven with front wheel 14, 16 in AWD situations.

Figure 1B:
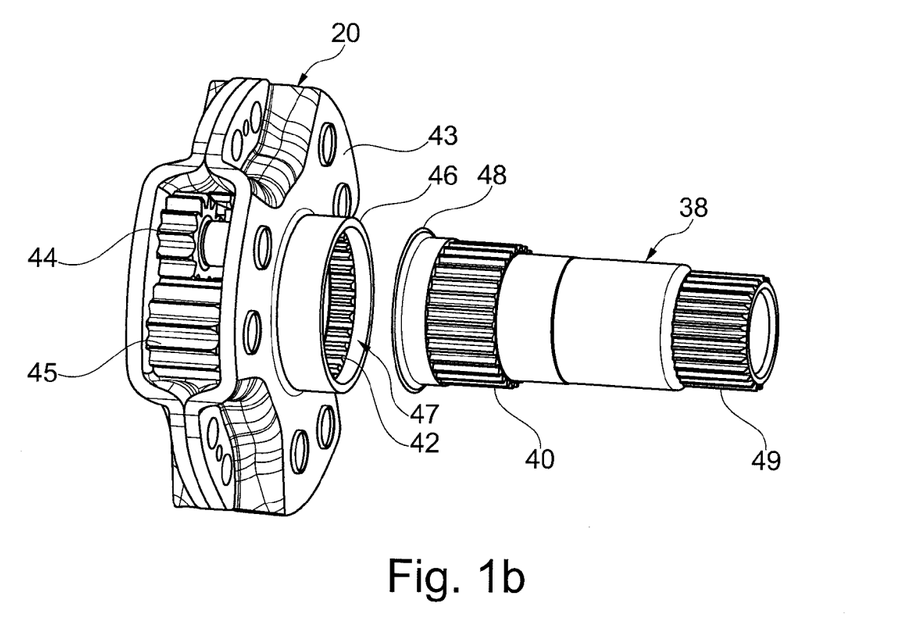

FIG. 1b shows front differential 20 and input shaft 38 of PTU 26. In this preferred embodiment differential 20 is a spur gear differential, such as disclosed in U.S. Patent Application Publications U.S. 2011/0045934 and U.S. 2011/0245012. In other embodiments, actuator 50 may be used with other differentials and/or other rotary couplings. Actuator 50, which is shown in detail in FIGS. 2a and 2b and discussed in detail below, is positionable between a first rotatable component, which may be PTU input shaft 38, and a second rotatable component, which may be spur gear differential 20 so that inner splines 70 of actuator 50 are connected to splines 40 of input shaft 38 and outer splines 72 of actuator 50 are connectable to splines 42 of differential 20. Differential 20 includes a carrier 43 which carries planet gears 44, 45 and two sun gears, which are connectable to the left half axle 22 and the right half axle 24. Differential 20 also includes a collar 46 located on carrier 42 and includes splines 42. Here the carrier 43 has an opening 47 defined therein for receiving input shaft 38 and an actuation part 66 of actuator 50, with actuator 50 being on the outer circumference of input shaft 38. When input shaft 38 is received in opening 47, an annular flange 48 located at one end of input shaft 38 is engaged behind carrier 43. PTU input shaft 38 also includes an additional set of splines 49 at the end opposite of splines 40 for engagement in power takeoff unit 26 (FIG. 1a).

Figure 2A:
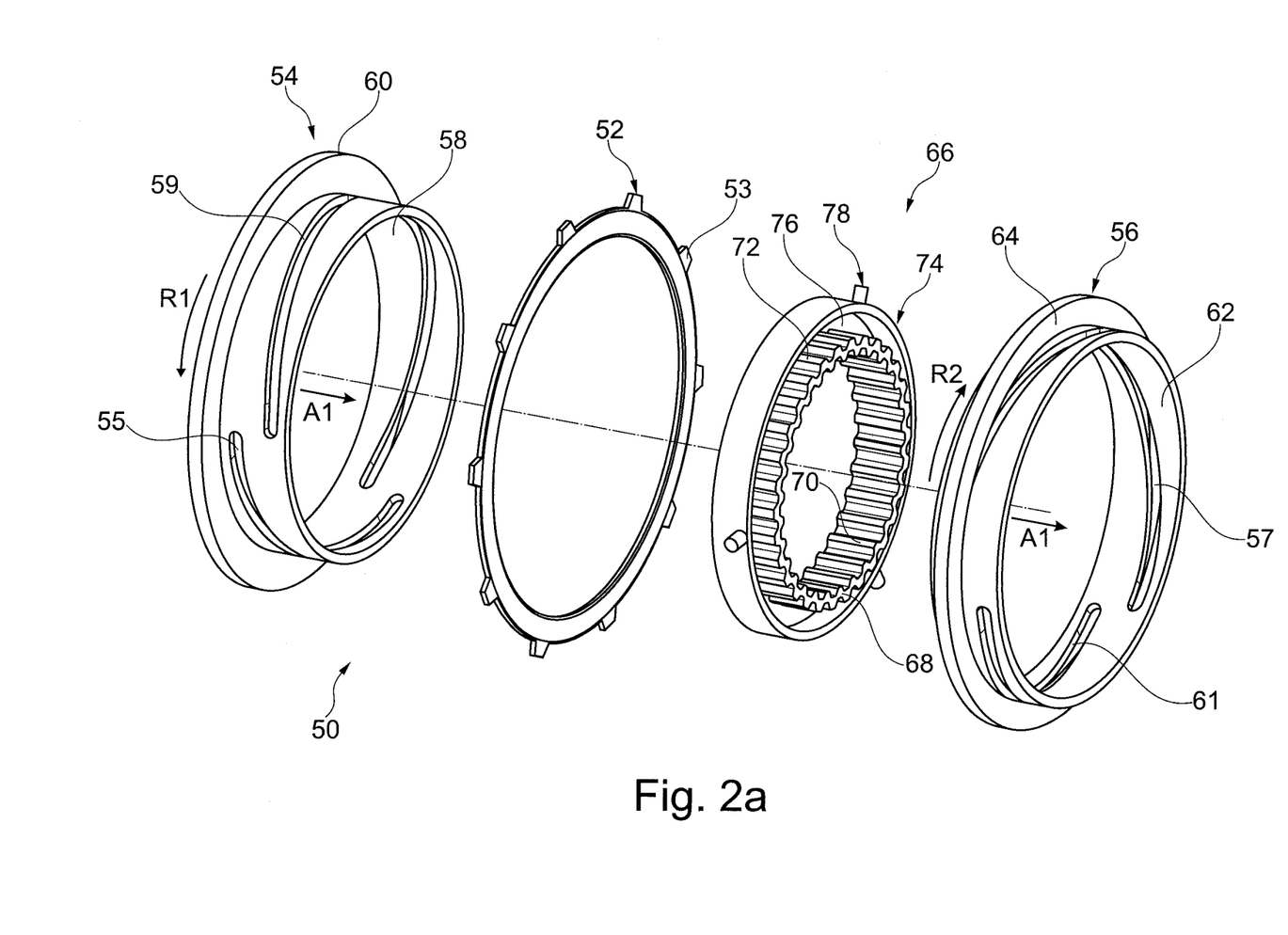
FIG. 2a shows an exploded view of a bi-directional actuator for the motor vehicle drive train in accordance with an embodiment of the present invention.
Figure 2B:
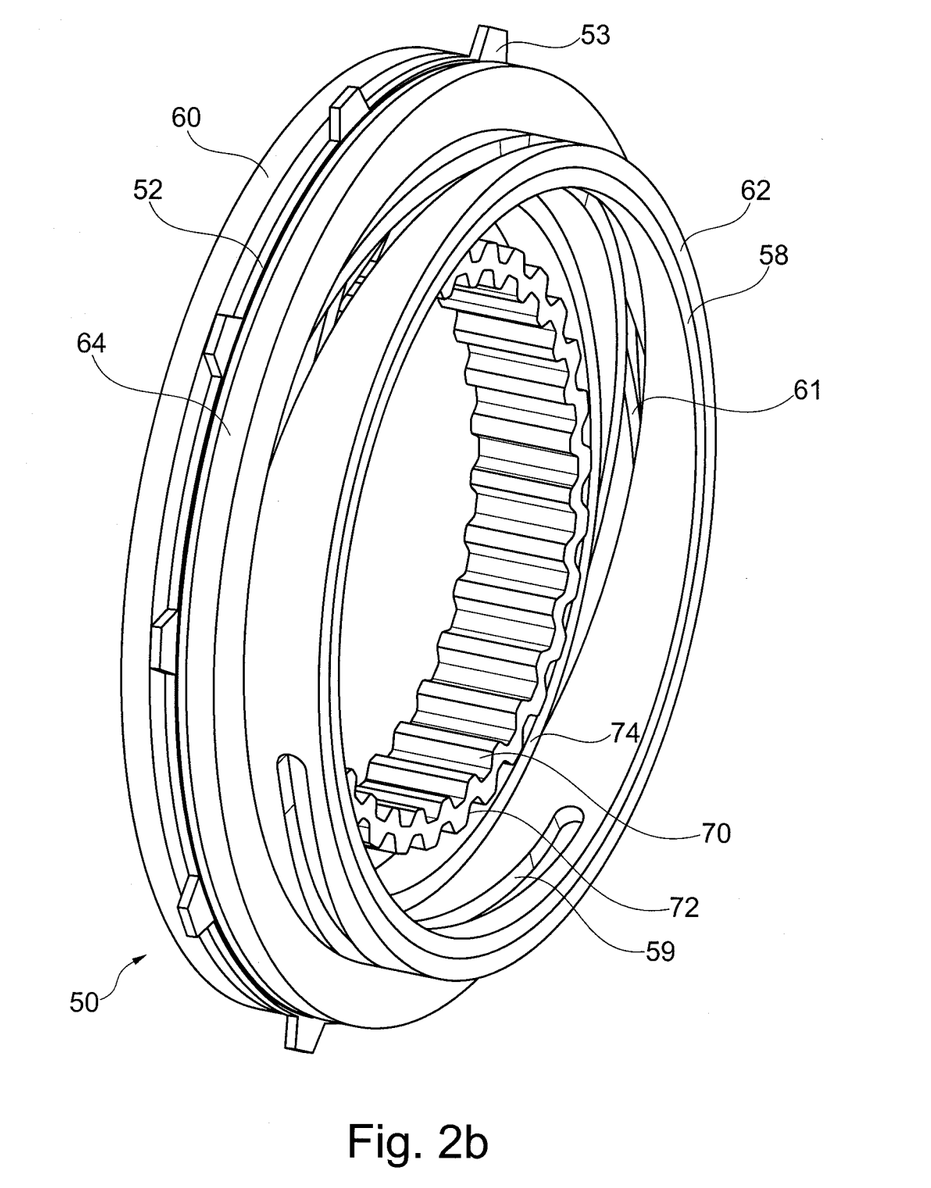

FIG. 2a shows an exploded view of bi-directional actuator 50 for the motor vehicle drive train in accordance with an embodiment of the present invention. FIG. 2b shows a perspective view of the actuator 50. Actuator 50 includes an activation part in the form of a clutch plate or ring 52 axially between a first axially stationary part, which is in the form of an inner cam sleeve 54, and a second axially stationary part, which is in the form of an outer cam sleeve 56. In particular, inner cam sleeve 54 includes an axially extending tube portion 58 and a radially extending plate portion 60 at an end of axially extending tube portion 58 and outer cam sleeve 56 includes an axially extending tube portion 62 and a radially extending plate portion 64 in the middle of axially extending tube portion 62, with clutch plate 52 being axially between plate portions 58, 62 and extending circumferentially around tube portion 62 of outer cam sleeve 56. Clutch plate 52 includes a plurality of radial protrusions 53 for engaging a housing to prevent the rotation of clutch plate 52. Each of cam sleeves 54, 56 includes cam surfaces 59, 61 formed by a plurality of respective slots 55, 57 in tube portions 58, 62, respectively. Slots 55 are angled in sleeve 54 and slots 57 are angled in sleeve 56 such that they extend different directions. Specifically, slots 55 extend both axially and circumferentially within inner cam sleeve 54 such that each slot 55 extends in a first axial direction A1 and a first rotational direction R1, while slots 57 extend both axially and circumferentially within outer cam sleeve 56 such that each slot 57 extends in the first axial direction A1 and a second rotational direction R2 opposite of R1.

Actuator 50 also includes an actuation part in the form of a dog clutch sleeve 66 including a connection ring 68 having a first engagement surface 70 for constantly mechanically engaging the first rotatable component, which in this embodiment is the PTU input shaft, and a second engagement surface 72 that are selectively mechanically engaged to and mechanically disengaged from a second rotatable component, which is this embodiment is a differential input. In this embodiment, first engagement surface 70 is formed by inner splines on an inner circumferential surface of connection ring 68 and second engagement surface 72 is formed by outer splines on an outer circumferential surface of connection ring 68. Dog clutch sleeve 66 also includes an axially extending tube portion 74 that is coupled to connection ring 68 by an annular plate portion 76 extending radially between connection ring 68 and axially extending tube portion 74. Tube portion 74 supports a plurality of cam followers in the form of pins 78 extending radially outward from an outer circumferential surface of tube portion 74.

When actuator 50 is in its assembled state, an inner circumferential surface of tube portion 62 of outer cam sleeve 56 contacts an outer circumferential surface of tube portion 58 of inner cam sleeve 54 and an inner circumferential surface of tube portion 58 of inner cam sleeve 54 contacts the outer circumferential surface of tube portion 74 of dog clutch sleeve 66, such that pins 78 extend radially through corresponding slots 57 in outer cam sleeve 56 into corresponding slots 55 in inner cam sleeve 54 to act as cam followers on cam surfaces 59, 61.

Figure 3A:
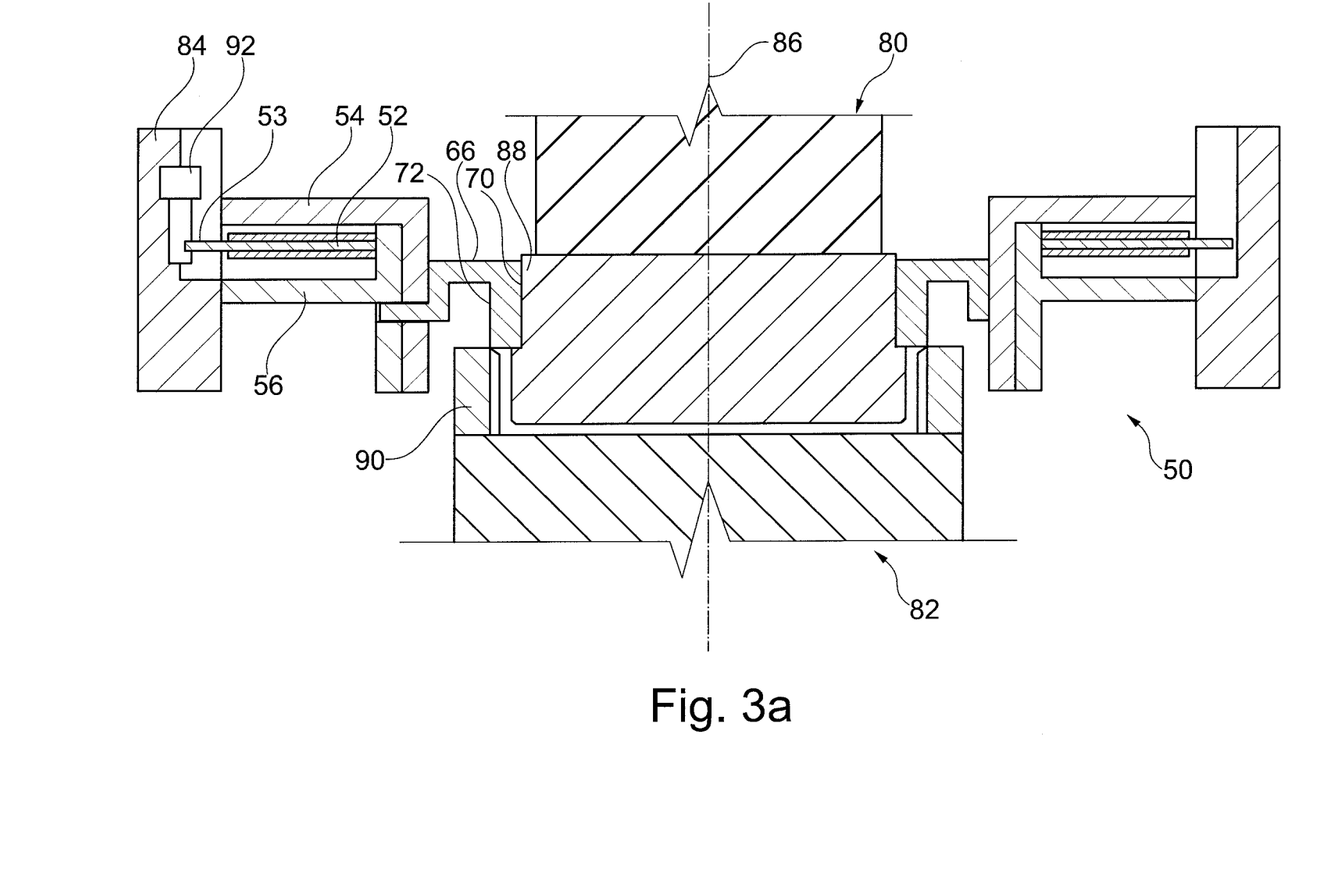
FIGS. 3a and 3b show schematic cross-sectional views of the bi-directional actuator in two different positions.
Figure 3B:
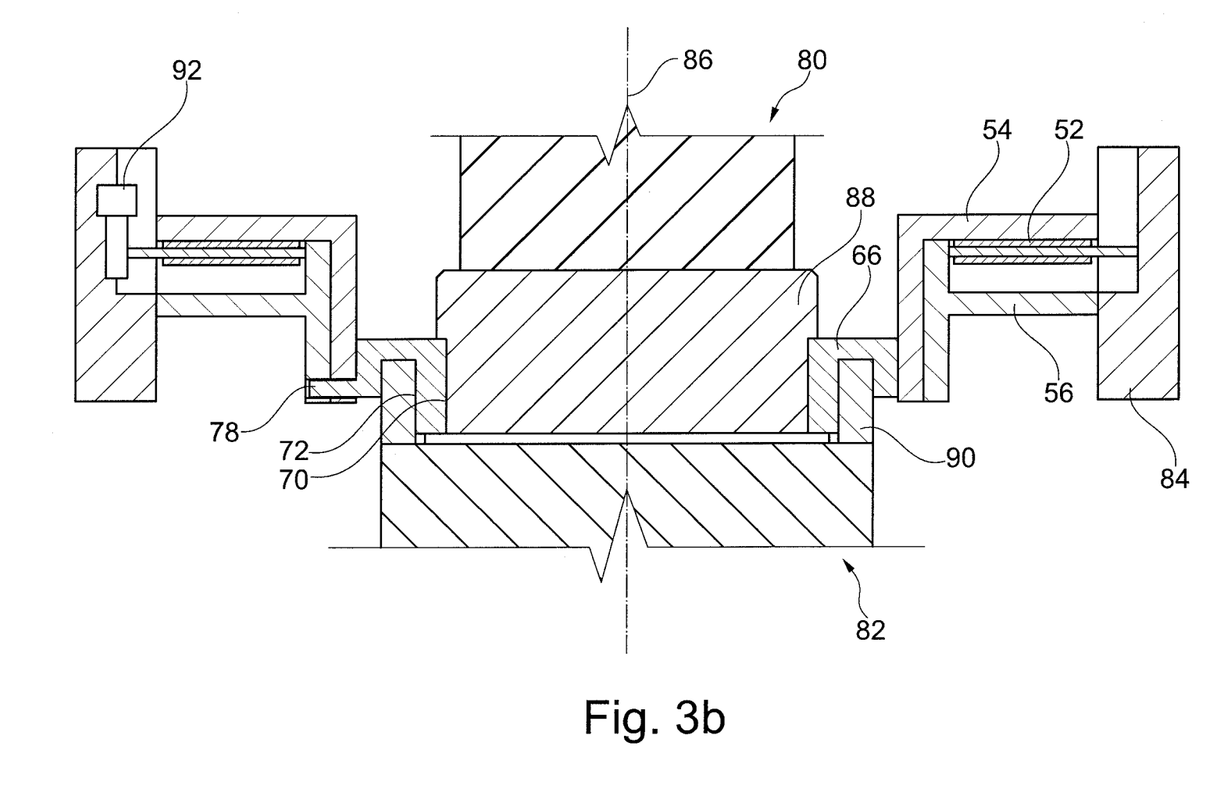

FIGS. 3a and 3b show schematic cross-sectional views of a torque coupling include actuator 50 and a housing 84. FIG. 3a shows actuator 50 engaged with a first rotatable component 80 and disengaged from a second rotating component 82, while FIG. 3b shows actuator 50 engaged with both rotating components 80, 82. As clearly shown in FIGS. 3a, 3b, clutch plate 52 is slidably positioned between sleeves 54, 56 in rotatably fixed arrangement, with protrusions 53 of clutch plate 52 extending into housing 84, meshing with corresponding aligned slots in an inner circumference of housing 84 that extend axially to allow clutch plate 52 to slide axially, but preventing clutch plate 52 from rotating. Sleeves 54, 56 are each axially fixed to housing 84, but are arranged to be rotatable about axis 86, by for example appropriate bearings.

In FIG. 3a, actuator 50 is in an idling position, with clutch plate 52 being spaced from both of sleeves 54, 56. Inner splines 70 of dog sleeve 66 are meshed with outer splines of a splined portion 88 of rotatable component 80. During idle spinning of rotatable component 80 within actuator 50, cam sleeves 54, 56 and dog clutch sleeve 66 spin together, due to the engagement between pins 78 and slots 55, 57.

To engage the second rotatable component 82, such that first rotatable component 80 drives second rotatable component 82 via dog sleeve 66, the clutch ring 52 is moved by an actuator 92 to contact inner cam sleeve 54 and a frictional surface of clutch plate 52 slows down the rotational speed of inner cam sleeve 54. A turning motion of the dog clutch sleeve 66 relative to sleeves 54, 56 causes sliding pins 78 of dog clutch sleeve 66 to ride along the cam slots 55 in inner cam sleeve 54 and move dog clutch sleeve 66 axially toward second rotatable component 82 such that outer splines 72 are meshed with an inner splines of a splined portion 90 of second rotatable component 82.

To disengage dog clutch sleeve 66 from second rotatable component 82, clutch ring 52 is moved by actuator 92 into contact with outer cam sleeve 56 and drags outer cam sleeve 56 and slide pins 78 along slots 57 in outer cam sleeve 56 to move dog clutch sleeve 66 axially away from second rotatable component 82.

FIGS. 4a to 4e further illustrate how pins 78 move within slots 55, 57 to axially move dog clutch sleeve 66. FIGS. 4a to 4e show a cross-sectional view of actuator 50, with the addition of one slot 55, one slot 57 and one pin 78 to illustrate how slots 55, 57 move with respect to each other. The below discussion of FIGS. 4a to 4e mentions components in FIGS. 2, 3a, 3b that have been omitted from FIGS. 4a to 4e for clarity.

Figure 4A:
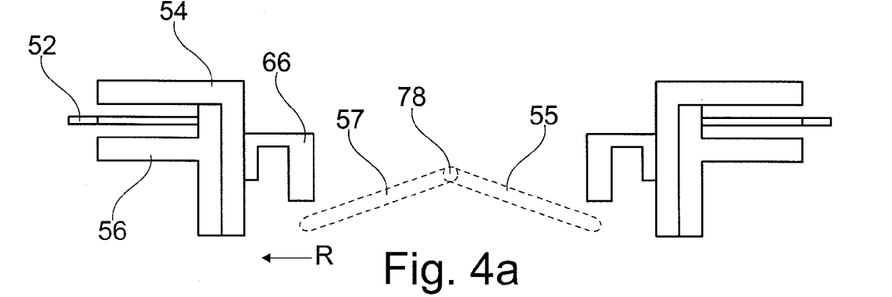
FIGS. 4a to 4e further illustrate how pins of the bi-directional actuator move within the slots of the actuator to move the dog clutch sleeve of the actuator.

FIG. 4a shows the idling position of actuator 50. In this position, cam sleeves 54, 56 and dog sleeve 66 are being rotated at the same speed about axis 86 in direction R by first rotatable component 80 and clutch plate 52 is not frictionally engaged with either of cam sleeves 54. Dog clutch sleeve 66 is at its topmost position as shown in FIGS. 4a to 4e and is not engaged with second rotatable component 82. The rotation of sleeves 54, 56, 66 at the same speed causes pin 78 to remain in a topmost position of both of slots 55, 57.

Figure 4B:
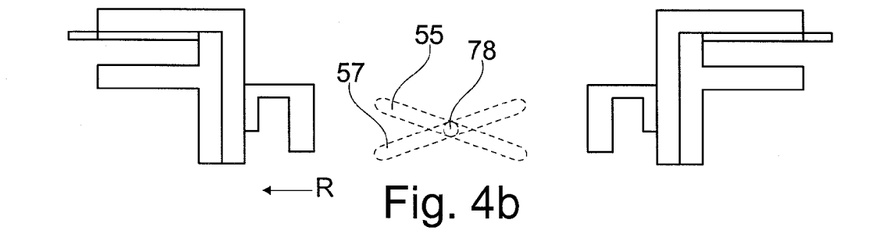

FIG. 4b shows actuator 50 after clutch plate 52 contacts inner cam sleeve 54, slowing the rotation of inner cam sleeve 54 in direction R with respect to dog clutch sleeve 66. The speed difference between inner cam sleeve 54 and dog clutch sleeve 66, causes pin 78 to move in the direction R faster than slot 55, causing the cam surface of slot 55 to move pin 78 and dog clutch sleeve 66 downward into contact with second rotatable component 82. The movement of pin 78 by slot 55 forces pin 78 to move within slot 57, increasing the speed of outer cam sleeve 56 with respect to dog clutch sleeve 66. FIG. 4b shows dog clutch sleeve 66 in the middle of being actuated toward second rotatable component 82.

Figure 4C:
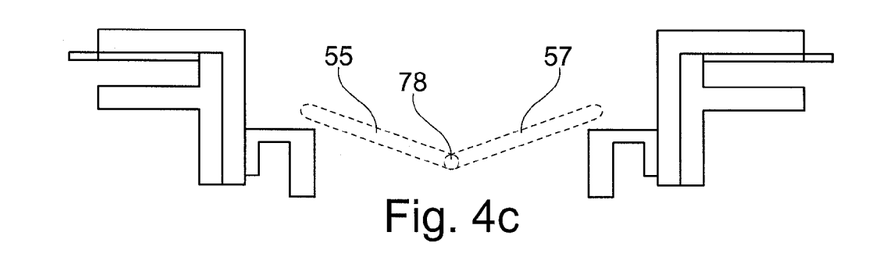

FIG. 4c shows actuator 50 at the bottommost position with respect to FIGS. 4a to 4e, where outer splines 72 of dog clutch sleeve 66 are fully engaged with inner splines of splined portion 90 of second rotatable component 82. The speed differences between cam sleeves 54, 56 and dog clutch sleeve 66 have forced pin 78 into the bottommost positions of slots 55, 57.

Figure 4D:
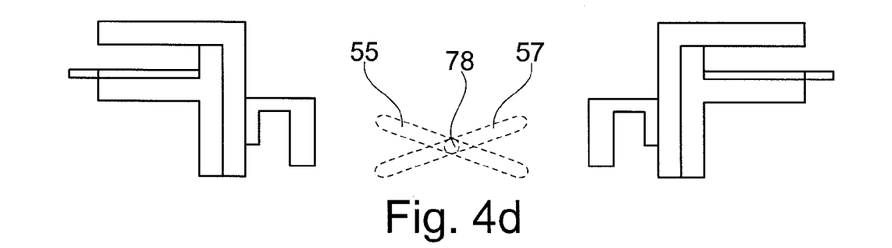

FIG. 4d shows actuator 50 after clutch plate 52 contacts outer cam sleeve 56, slowing the rotation of outer cam sleeve 56 in direction R with respect to dog clutch sleeve 66. The speed difference between outer cam sleeve 64 and dog clutch sleeve 66, causes pin 78 to move in the direction R faster than slot 57, causing the cam surface of slot 57 to move pin 78 and dog clutch sleeve 66 upward. The movement of pin 78 by slot 57 forces pin 78 to move within slot 55, increasing the speed of inner cam sleeve 54 with respect to dog clutch sleeve 66. FIG. 4d shows dog clutch sleeve 66 in the middle of being actuated away from second rotatable component 82.

Figure 4E:
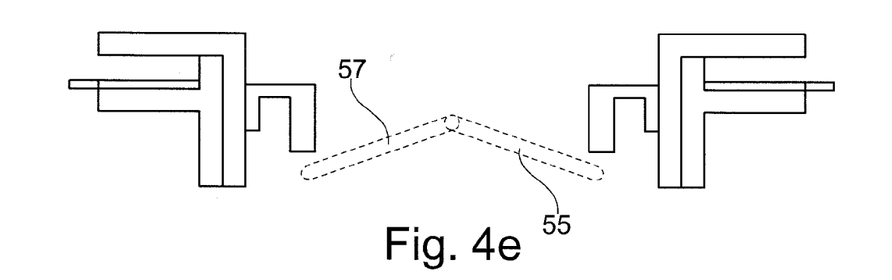

FIG. 4e shows actuator 50 back at the topmost position with respect to FIGS. 4a to 4e, where outer splines 72 of dog clutch sleeve 66 are fully disengaged from inner splines of splined portion 90 of second rotatable component 82. The speed differences between cam sleeves 54, 56 and dog clutch sleeve 66 have forced pin 78 into the topmost positions of slots 55, 57.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A bi-directional actuator for a motor vehicle drive train comprising:
    a first axially stationary part;
    a second axially stationary part;
    an activation part between the first axially stationary part and the second axially stationary part, the activation part being axially movable to alternately contact the first axially stationary part and the second axially stationary part; and
    an actuation part engaging the first axially stationary part and the second axially stationary part, contact between the activation part and the first axially stationary part causing the first axially stationary part to force the actuation part in a first axial direction, contact between the activation part and the second axially stationary part causing the second axially stationary part to force the actuation part in a second axial direction, the activation part being a clutch plate.

2. The bi-directional actuator as recited in claim 1 wherein the first axially stationary part includes a first axially extending sleeve portion and the second axially stationary part includes a second axially extending sleeve portion, the actuation part engaging the first axially extending sleeve portion and the second axially extending sleeve portion.

3. The bi-directional actuator as recited in claim 1 wherein the actuation part includes a first engagement surface for mechanically engaging a first rotatable component and a second engagement surface for mechanically engaging a second rotatable component.

4. The bi-directional actuator as recited in claim 1 wherein the first axially stationary part includes at least one first cam surface and the second axially stationary part includes at least one second cam surface, the actuation part including at least one cam follower for engaging the at least one first cam surface and the at least one second cam surface.

5. The bi-directional actuator as recited in claim 1 wherein the first axially stationary part is an inner clutch sleeve, the second axially stationary part is an outer clutch sleeve and the actuation part is a dog clutch sleeve.

6. The bi-directional actuator as recited in claim 5 wherein the contact of the inner clutch sleeve with the clutch plate includes frictionally engaging the inner clutch sleeve with the clutch plate to slow rotation of the inner clutch sleeve, and the contact of the outer clutch sleeve with the clutch plate includes frictionally engaging the outer clutch sleeve with the clutch plate to slow rotation of the outer clutch sleeve.

7. The bi-directional actuator as recited in claim 6 wherein the inner clutch sleeve includes at least one cam surface and the dog clutch sleeve includes at least one cam follower, the clutch plate slowing the rotation of the inner clutch sleeve causing the at least one cam follower to slide from a first end of the at least one cam surface of the inner clutch sleeve to a second end of the at least one cam surface of the inner clutch sleeve to force the dog clutch sleeve in the first axial direction.

8. The bi-directional actuator as recited in claim 7 wherein the outer clutch sleeve includes at least one cam surface, the clutch plate slowing the rotation of the outer clutch sleeve causing the at least one cam follower to slide from a first end of the at least one cam surface of the outer clutch sleeve to a second end of the at least one cam surface of the outer clutch sleeve to force the dog clutch sleeve in the second axial direction.

9. The bi-directional actuator as recited in claim 8 wherein the dog clutch sleeve includes a first engagement surface and a second engagement surface, the first engagement surface configured for mechanically engaging a first rotatable component during the slowing the rotation of the inner clutch sleeve and the slowing the rotation of the outer clutch sleeve, the second engagement surface configured for mechanically engaging a second rotatable component during the slowing the rotation of the inner clutch sleeve and mechanically disengaging the second rotatable component during the slowing the rotation of the outer clutch sleeve.

10. The bi-directional actuator as recited in claim 9 wherein the first engagement surface is formed by an inner splined surface and the second engagement surface is formed by an outer splined surface.

11. The bi-directional actuator as recited in claim 8 wherein the at least one cam surface of the inner clutch sleeve is formed by at least one first slot formed in the inner clutch sleeve, the at least one cam surface of the outer clutch sleeve is formed by at least one second slot formed in the outer clutch sleeve and the at least one cam follower is at least one radially extending pin for sliding in the at least one first slot and the at least one second slot.

12. A torque coupling comprising:
the bi-directional actuator as recited in claim 1;
a housing, the first axially stationary part and the second axially stationary part being axially fixed to the housing, the activation part being rotationally fixed to the housing.

13. The torque coupling as recited in claim 12 further comprising an actuator for moving the activation part to contact the first axially stationary part and the second axially stationary part.

14. A motor vehicle drive train comprising:
a first rotatable component;
a second rotatable component; and
the torque coupling as recited in claim 12 for selectively connecting the first rotatable component to the second rotatable component.

15. The motor vehicle drive train as recited in claim 14 wherein the second rotatable component is connected to an engine driving a first pair of wheels and the first rotatable component is connected to a second pair of wheels.

16. The motor vehicle drive train as recited in claim 15 wherein the engine drives the second pair of wheels when the torque coupling connects the first rotatable component to the second rotatable component.

17. A bi-directional actuator for a motor vehicle drive train comprising:
a first axially stationary part;
a second axially stationary part;
an activation part between the first axially stationary part and the second axially stationary part, the activation part being axially movable to alternately contact the first axially stationary part and the second axially stationary part; and
an actuation part engaging the first axially stationary part and the second axially stationary part, contact between the activation part and the first axially stationary part causing the first axially stationary part to force the actuation part in a first axial direction, contact between the activation part and the second axially stationary part causing the second axially stationary part to force the actuation part in a second axial direction, the first axially stationary part including a first radially extending plate portion and the second axially stationary part includes a second radially extending plate portion, the activation part alternately contacting the first radially extending plate portion and the second radially extending plate portion.

18. A bi-directional actuator for a motor vehicle drive train comprising:
a first axially stationary part;
a second axially stationary part;
an activation part between the first axially stationary part and the second axially stationary part, the activation part being axially movable to alternately contact the first axially stationary part and the second axially stationary part; and
an actuation part engaging the first axially stationary part and the second axially stationary part, contact between the activation part and the first axially stationary part causing the first axially stationary part to force the actuation part in a first axial direction, contact between the activation part and the second axially stationary part causing the second axially stationary part to force the actuation part in a second axial direction, the first axially stationary part including at least one first cam surface and the second axially stationary part includes at least one second cam surface, the actuation part including at least one cam follower for engaging the at least one first cam surface and the at least one second cam surface, the at least one first cam surface being formed by at least one first slot formed in the first axially stationary part, the at least one second cam surface is formed by at least one second slot formed in the second axially stationary part and the at least one cam follower is at least one radially extending pin for sliding in the at least one first slot and the at least one second slot.

19. The bi-directional actuator as recited in claim 18 wherein the at least one first slot extends axially and circumferentially in the first axially stationary part such that the at least one first slot extends in the first axial direction and a first rotational direction, the at least one second slot extends axially and circumferentially in the second axially stationary part such that the at least one second slot extends in the second axial direction and a second rotational direction opposite the first rotational direction.

* * * * *